United States Patent [19]

Buta et al.

[11] 4,242,024
[45] Dec. 30, 1980

[54] APPARATUS FOR PALLETIZING SHEET MATERIAL

[75] Inventors: John R. Buta, Salem; John H. Gehring, McDonald; Thomas J. Drotleff, Salem, all of Ohio

[73] Assignee: Paxson Machine Company, Salem, Ohio

[21] Appl. No.: 946,741

[22] Filed: Sep. 29, 1978

[51] Int. Cl.$^3$ ............................................. B65G 57/10
[52] U.S. Cl. ..................................... 414/43; 271/213; 271/217
[58] Field of Search ............... 414/43, 45, 52, 90, 414/110, 564, 68, 77, 41, 108; 271/213, 217, 218, 224; 83/89

[56] References Cited

U.S. PATENT DOCUMENTS

| | | | |
|---|---|---|---|
| 2,205,767 | 6/1940 | Lamb | 271/218 |
| 2,467,203 | 4/1949 | Gelbman | 414/564 |
| 2,548,767 | 4/1951 | Brest | 414/564 |
| 2,946,465 | 7/1960 | Raynor | 414/68 |
| 3,279,792 | 10/1966 | Kostal et al. | 271/218 |
| 3,298,683 | 1/1967 | Stroud | 271/218 |
| 3,420,386 | 1/1969 | Morrow et al. | 414/45 |
| 3,425,570 | 2/1969 | De Voe, Jr. | 414/77 |
| 3,517,831 | 6/1970 | Hahn | 414/41 |
| 3,642,151 | 2/1972 | Hayes | 414/45 |
| 3,866,498 | 2/1975 | Jarman | 83/89 |
| 4,015,723 | 4/1977 | Beaty, Jr. et al. | 414/41 |
| 4,030,618 | 6/1977 | Kelley et al. | 414/108 |

Primary Examiner—L. J. Paperner
Assistant Examiner—Lawrence E. Williams
Attorney, Agent, or Firm—Meyer, Tilberry & Body

[57] ABSTRACT

A fork lift mechanism is associated with apparatus for palletizing long sheets of strip material at the discharge end of a shearing press. The long sheets are palletized on an underlying conveyor having a width corresponding to the length of the sheets in the direction of discharge from the press. The fork lift mechanism is supported above the conveyor for displacement toward and away from the shearing press in the direction of the discharge and is adapted to be elevated and lowered relative to the conveyor. The fork lift mechanism is operable to receive and support a plurality of short sheets from the press to form a stack on the fork lift mechanism and to position a plurality of such stacks on a pallet on the conveyor and in side-by-side relationship on the pallet in the direction of press discharge and/or in the direction of conveyor movement.

22 Claims, 5 Drawing Figures

APPARATUS FOR PALLETIZING SHEET MATERIAL

BACKGROUND OF THE DISCLOSURE

This invention relates to the art of material handling and, more particularly, to improved apparatus for palletizing sheet material.

The present invention finds particular utility in connection with the palletizing of sheet metal onto a conveyor at the discharge end of a shearing press, which conveyor facilitates transferring the palletized sheet metal laterally away from the press with respect to the direction of discharge of the press. Accordingly, the invention will be described herein in detail in connecetion with such a press and conveying arrangement. However, it will be understood that the invention is applicable to the palletizing of sheet material other than metal sheets, to the palletizing of sheet material received from a source other than a shearing press, and to the palletizing of sheet material on a support arrangement other than a conveyor.

Palletizing apparatus has been provided heretofore in association with the discharge end of a metal shearing press and by which sheets of metal up to a given length are stacked on a pallet or pallets on a conveyor mechanism at the discharge end of the press. The conveyor extends laterally with respect to the direction of discharge of the press and has a width corresponding generally to that of the given length of the metal sheets. Accordingly, the full width of the conveyor is utilized when sheets of the given length are palletized. However, particular customer orders may require the palletizing of metal sheets of a length less than half the width of the conveyor and, while such previous palletizing apparatus is operable to achieve stacking of such shorter sheets, it is only capable of positioning one such stack on the side of the conveyor adjacent the press. Accordingly, in such situations the remaining width of the conveyor cannot be utilized. More particularly in this respect, the palletizing apparatus and conveyor may be capable of handling sheet material which is ten feet long in the direction of discharge. If it then becomes necessary or desirable, for example, to palletize sheet material from the press in lengths of eighteen inches with respect to the direction of discharge, it will be appreciated that less than one-sixth of the width of the conveyor can be utilized. This, of course, results in uneconomical utilization of the conveyor either for transporting or for temporary storage of palletized sheet material, and inefficient utilization of the palletizing apparatus. Moreover, floor space and economical considerations make it impractical to provide a plurality of shearing presses and corresponding palletizing mechanisms for handling sheet material of a number of different lengths.

SUMMARY OF THE INVENTION

In accordance with the present invention, apparatus is provided for palletizing sheet material received from a source in a manner whereby stacks of material on corresponding pallets can be arranged side-by-side on a support surface with respect to the direction of delivery of the sheet material from the source. Thus, in connection with the palletizing of metal sheets from a shearing press and the positioning thereof on an associated conveyor having a given width in the direction of press discharge, two or more pallets of sheet material can be positioned side-by-side in the direction of the width of the conveyor to more fully utilize the conveyor than heretofore possible. In fact, the present invention enables utilizing substantially the entire width of the conveyor in this manner, thus increasing the versatility of both the shearing press and the palletizing apparatus in connection with meeting the expected requirements for different lengths of sheet material from customers. In this respect, the palletizing apparatus of the present invention preferably is adapted to supplement palletizing apparatus capable of handling sheet material in lengths up to the conveyor width, whereby sheets of any length up to that corresponding to the width of the conveyor can be palletized in a manner which most economically utilizesthe conveyor width for the given length of sheet material being palletized.

More particularly in accordance with the preferred embodiment of the present invention, a fork lift mechanism is supported for linear movement in the direction of material discharge toward and away from the point of discharge. Further, the fork lift mechanism is supported for vertical displacement relative to an underlying support surface onto which stacks of sheet material are to be delivered. The fork lift mechanism includes fork members adapted to receive individual sheets at the point of material discharge so as to form a stack of sheets on the fork members. When a given stack height is reached, the stack is lowered by the fork lift mechanism onto a pallet positioned on the underlying support surface. The mechanism is then operated to reposition the fork members adjacent the point of discharge. The fork members then receive sheets to form a second stack and, when a given stack height is again reached, the fork lift mechanism is displaced away from the point of discharge to a position overlying a location on the support surface adjacent the first stack in the direction of discharge. The fork lift mechanism is then lowered to deliver the second stack to the latter location and thus to a position on the support surface in line with the first stack in the direction of material discharge. The second stack can be deposited on the same pallet as the first stack, or on a second pallet on the support surface. This stacking and delivering operation is repeated until the underlying support surface has received as many stacks of palletized sheet material as possible. If the support surface is a conveyor, then the line of stacks can be conveyed laterally to a position which enables another line of stacks to be positioned on the conveyor laterally adjacent and parallel to the first line.

Additionally, in connection with a conveyor, the fork lift mechanism enables the positioning of stacks side-by-side with respect to the direction of conveyor movement and on a single pallet supported on the conveyor. In this respect, stacks having a width in the direction of conveyor movement no more than half the width of a pallet on the conveyor would be deposited on the pallet to one side of the center thereof. The conveyor is then jogged to position the empty side of the pallet beneath the fork lift mechanism enabling the second stack to be received thereon adjacent the first stack in the direction of conveyor movement. A second pallet can then be positioned on the conveyor in alignment with the first pallet in the direction of press discharge, and two stacks of sheet metal can be deposited thereon in the foregoing manner through appropriate manipulation of the fork lift mechanism and jogging of the conveyor.

It will be appreciated, therefore, that the palletizing capabilities provided by the fork lift mechanism are versatile and enable multiple side-by-side stacking on a single pallet or on separate pallets and both in the direction of press discharge and the direction of conveyor movement. Accordingly, a more efficient and economical utilization of pallets and conveyor span is enabled than heretofore possible, together with improved efficiency and ease with respect to the subsequent handling and/or transportation of a plurality of stacks of short sheets deposited on a conveyor.

In accordance with another aspect of the present invention, the fork lift mechanism is supported by a carriage mounted on an elevated track extending in the direction of discharge. The carriage supports the fork lift mechanism for horizontal linear displacement in the direction of discharge and for vertical displacement relative to the underlying support surface. In the preferred embodiment, the fork lift mechanism includes a pair of vertical fork lift rods slidably interengaged with the carriage and having a fork lift member assembly detachably secured to the lower ends thereof. The latter assembly includes two or more fork lift members adjustably and removably mounted on a support bar which is detachably secured to the posts. Accordingly, the fork lift members are positionally adjustable and removable from the support bar for repair and/or replacement purposes, and the fork lift member assembly can be detached from the fork lift rods for removal as a unit from the palletizing apparatus.

It is accordingly an outstanding object of the present invention to provide improved apparatus for palletizing sheet material.

Another object is the provision of palletizing apparatus associated with a source of sheet material having a direction of discharge and a support surface area having a width in the direction of discharge and which apparatus is adapted to more efficiently utilize the support surface area in the direction of discharge than heretofore possible.

A further object is the provision of palletizing apparatus of the foregoing character adapted to receive sheet material from a source to form a stack and to sequentially deliver a plurality of stacks of sheet material into positions on the underlying support surface aligned in the direction of discharge and/or in the direction transverse thereto.

Another object is the provision of palletizing apparatus associated with a source of sheet material and a support surface having a width in the direction of discharge from the source and which apparatus is selectively operable to provide a stack of sheet material on the support surface in which the sheets are of a length up to the width of the support surface, or to provide two or more stacks of sheet material on the support surface in alignment with one another in the direction of discharge and/or in the direction transverse thereto.

Still a further object is the provision of palletizing apparatus associated with a source of sheet material and in overlying relationship with respect to a conveyor and which apparatus includes a fork lift mechanism adapted to receive sheet material from the source to form a stack and to deposit a plurality of stacks onto a single pallet on the conveyor with the stacks in alignment with one another in the direction of discharge and/or in the direction transverse thereto.

Yet another object is the provision of palletizing apparatus which includes a fork lift mechanism supported above a support surface for linear displacement toward and away from a source of sheet material and for vertical displacement toward and away from the underlying support surface and which fork lift mechanism is operable to receive sheet material at the source to form a stack and to deliver a plurality of such stacks to the support surface for the several stacks to be in alignment with one another in the direction of discharge and/or in the direction transverse thereto.

Yet a further object is the provision of palletizing apparatus of the foregoing character in which the fork lift mechanism includes fork lift members structurally associated with the remainder of the fork lift mechanism so as to facilitate positional adjustment of the fork lift members and removal thereof from the remainder of the fork lift mechanism.

BRIEF DESCRIPTION OF THE DRAWINGS

The foregoing objects, and others, will in part be obvious and in part pointed out more fully hereinafter in conjunction with the written description of the accompanying drawings illustrating a preferred embodiment of the invention and in which.

DESCRIPTION OF THE PREFERRED EMBODIMENT

Figure 1:
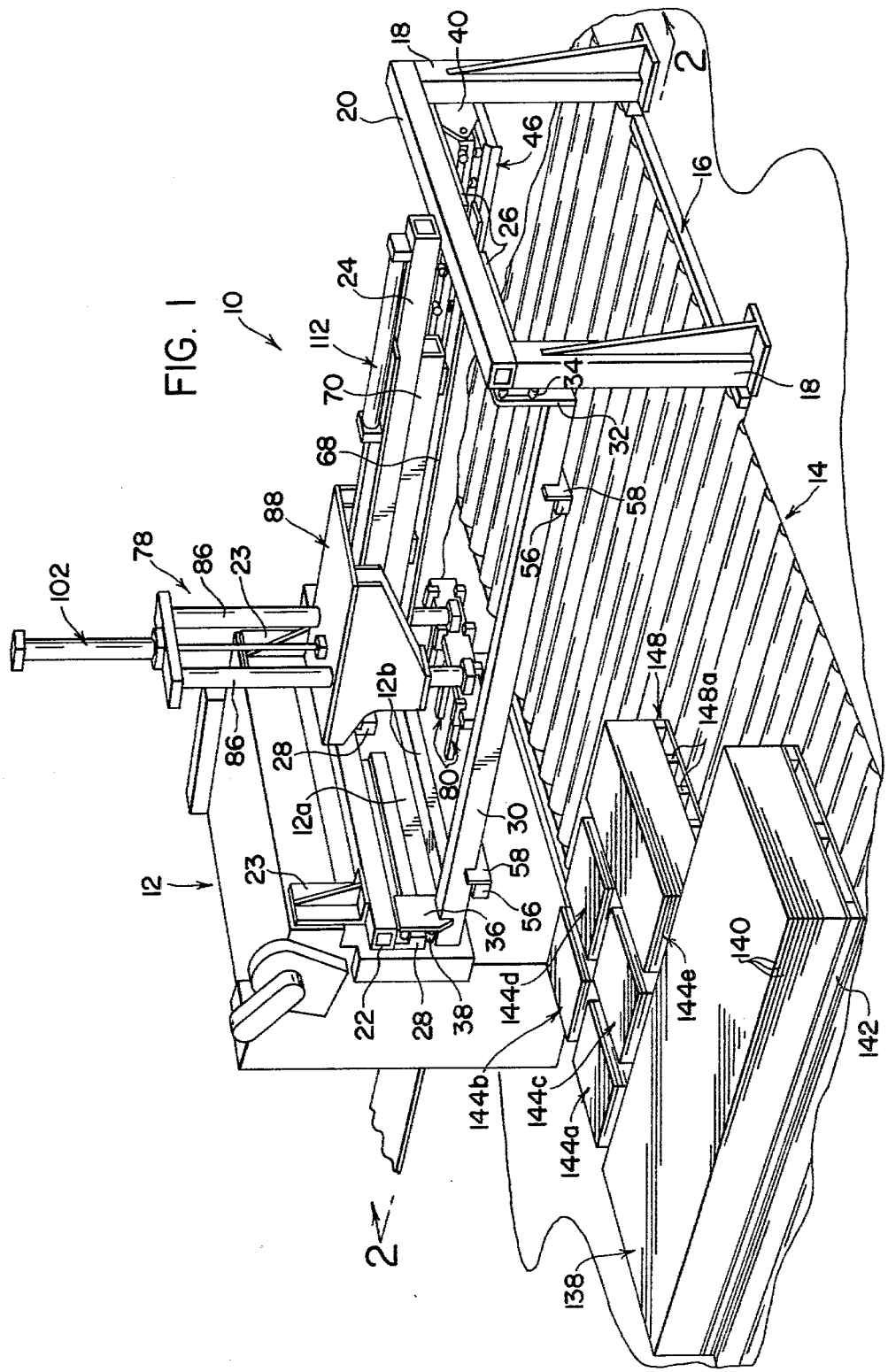
FIG. 1 is a perspective view showing palletizing apparatus of the present invention in association with a sheet metal shearing press and roller conveyor.
Figure 2:
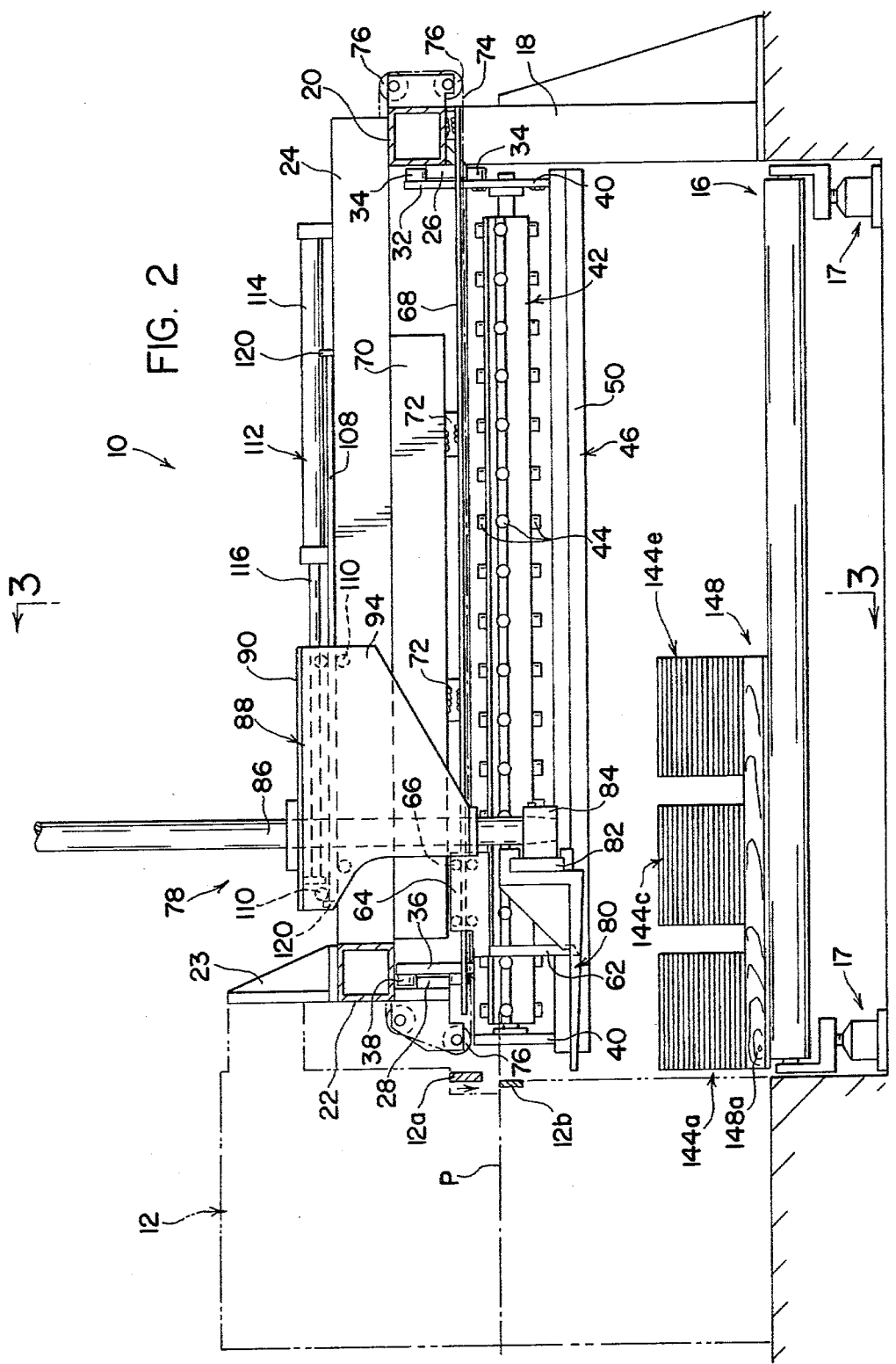
FIG. 2 is a sectional elevational view of the apparatus taken along line 2—2 in FIG. 1.
Figure 3:
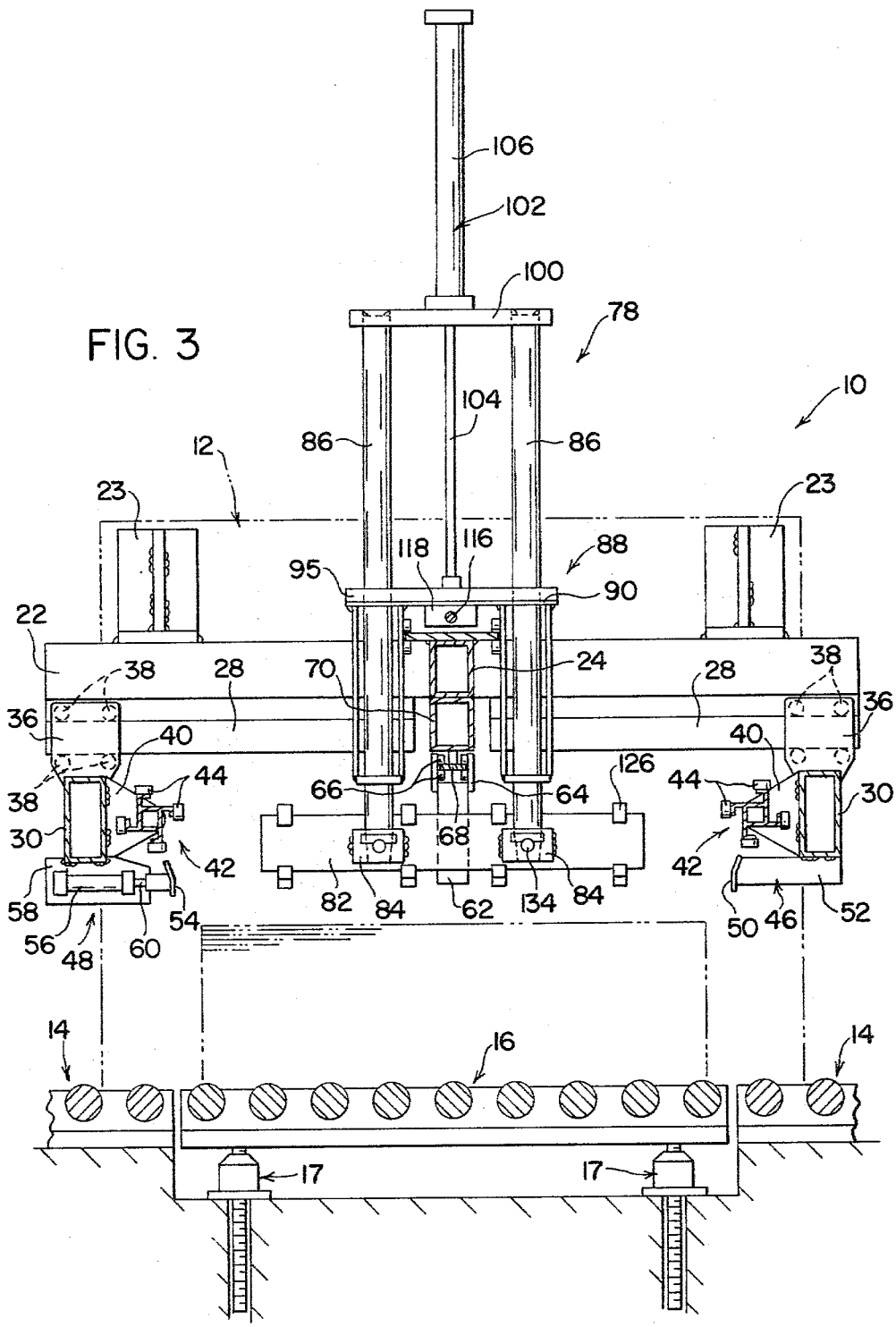
FIG. 3 is a sectional elevational view of the apparatus taken along line 3—3 in FIG. 2.

Referring now in greater detail to the drawings wherein the showings are for the purpose of illustrating a preferred embodiment of the invention only, and not for the purpose of limiting the invention, FIGS. 1–3 illustrate palletizing apparatus 10 associated with the discharge side of a sheet metal shearing press 12 and an underlying roller conveyor 14 onto which stacked sheet metal is delivered as set forth hereinafter for transfer away from the press. The structure and operation of press 12 is not important to the present invention, and it will be appreciated that sheet metal to be sheared by the press is delivered to the side thereof opposite the palletizing apparatus, and that through appropriate well known controls the press is actuated to sever predetermined lengths of the sheet material passing therethrough. In connection with the present invention, it is only important to note that palletizing apparatus 10 is located on the discharge side of the press 12 and adjacent the discharge point which, in the embodiment illustrated, is defined by relatively vertically reciprocable shearing members 12a and 12b. Additionally, it is to be noted that the point of discharge of sheet material from the press is elevated with respect to a support surface which, in the embodiment disclosed, is defined by roller conveyor 14. It will be appreciated, of course, that press 12 has a direction of discharge for the sheet material which is from left to right with respect to the apparatus as viewed in FIG. 2, and that the material is discharged along a horizontal path P. It will be further appreciated that conveyor 14 has a direction of conveying or transfer which is transverse to the direction of discharge of the press, whereby the conveyor has a width dimension in the direction of discharge. For the purpose set forth hereinafter, conveyor 14 includes a vertically reciprocable portion 16 underlying the path of sheet material discharged from the press. Conveyor portion 16 is adapted to be elevated and lowered by suitable jack units 17.

As seen in FIGS. 1-3, palletizing apparatus 10 includes a frame assembly comprising an outer end portion adjacent the remote side of conveyor 14 with respect to the direction of discharge. The latter frame portion is defined by a pair of vertical frame members 18 spaced apart in the direction of transfer of the conveyor and a horizontal frame member 20 interconnecting members 18 at the upper ends thereof. The frame assembly further includes a horizontal frame member 22 extending in the direction of transfer of the conveyor and attached to press 12 on the discharge side thereof by mounting brackets 23, and a horizontal frame member 24 extending in the direction of discharge of the press and having its opposite ends welded or otherwise suitably attached to frame members 20 and 22. While it is most practical to attach frame member 22 directly to the press, it will be appreciated that other structural arrangements could be provided for supporting frame member 22 with respect to the underlying shop floor.

Frame member 20 is provided with a pair of track members 26 which are suitably attached thereto, and frame member 22 is provided with a pair of track members 28 suitably attached thereto. A pair of side members 30 of the palletizing apparatus extend across conveyor 14 in the direction of discharge in parallel relationship to one another and are supported at their opposite ends by tracks 26 and 28 for horizontal displacement toward and away from one another. More particularly in this respect, each of the side members 30 is provided at the end thereof adjacent frame member 20 with a roller support plate 32 carrying a plurality of rollers 34 engaging upper and lower sides of track members 26. Similarly, the ends of side members 30 adjacent frame member 22 are provided with roller support plates 36 carrying a plurality of rollers 38 engaging upper and lower sides of track members 28. Accordingly, it will be appreciated that the tracks and rollers cooperate to support and guide horizontal displacement of side members 30 toward and away from one another, and that a suitable drive arrangement, not shown, is provided for so moving the side members.

As best seen in FIGS. 2 and 3 of the drawing, each side member 30 is provided at its opposite ends with a support plate 40 rotatably supporting the opposite ends of an indexing flipper assembly 42. Flipper assemblies 42 serve the purpose set forth hereinafter, and each flipper assembly is comprised of a plurality of sets of four rollers 44. The rollers of each set are equally spaced apart circumferentially with respect to the axis of rotation of the flipper assembly, and the sets of rollers are axially spaced apart between the opposite ends of the corresponding assembly. Side members 30 further carry side tamping devices for the purpose set forth hereinafter and which, in the embodiment shown and as best seen in FIG. 3, include a fixed side tamper assembly 46 on one of the side members and a laterally displaceable side tamper assembly 48 on the other side member. Tamper assembly 46 includes a tamper plate 50 extending between the opposite ends of the corresponding side member 30 and rigidly supported relative thereto such as by means of mounting plates 52. Tamping assembly 48 includes a side tamping plate 54 extending between the opposite ends of the corresponding side member and supported for lateral displacement relative to the side member by means of a plurality of fluid operated piston and cylinder units spaced apart between the opposite ends of a side member. Each of the piston and cylinder units includes a cylinder 56 attached to side member 30 such as by means of a corresponding mounting plate 58, and a piston member 60 having an outer end to which tamper plate 54 is securely fastened. It will be appreciated, of course, that piston and cylinder units 48 are connected to a suitable source of operating fluid and that flipper assemblies 42 are adapted to be rotated through a suitable indexing drive arrangement, not shown.

As best seen in FIGS. 2 and 3 of the drawing, the palletizing apparatus further includes an end stop member 62 suspended beneath frame member 24 and extending vertically downwardly with respect to discharge path P of press 12. End stop member 62 is longitudinally displaceable in the direction of discharge of the press from a position adjacent the press as shown in FIG. 2 to a position adjacent cross member 20 at the opposite end of the palletizing apparatus. More particularly in this respect, end stop member 62 is suitably attached such as by welding to a pair of support plates 64 carrying corresponding pairs of rollers 66 engaging opposite sides of a track plate 68 extending in the direction of discharge of the press. Track plate 68 is suitably supported beneath frame member 34 of the apparatus and, in the embodiment shown, is supported in suspension therebeneath by means of a tubular support member 70 welded or otherwise secured to frame member 24 and spacing blocks 72 welded or otherwise secured to member 70 and track plate 68. It will be appreciated therefore, that end stop member 62 is supported for displacement along track plate 68 and, in the embodiment shown, such displacement is achieved by means of an endless chain 74 trained about sprocket wheels 76 supported at the opposite ends of the frame structure and suitably connected to the end stop member for the latter to be displaced in response to displacement of the sprocket chain. The sprocket chain can of course be displaced in opposite directions by suitable drive motor, not shown. The purpose of end stop member 62 will be apparent from the description hereinafter of the operation of the palletizing apparatus.

Palletizing apparatus 10 further includes a fork lift mechanism 78 operable as set forth more fully hereinafter to receive short lengths of sheet material from press 12 and to position a number of stacks of such short sheets on conveyor 14 side-by-side and in alignment with one another in the direction of discharge and/or in the direction transverse thereto. Fork lift mechanism 78 is comprised of a plurality of fork lift members 80 extending toward press 12 and mounted on a support bar 82 extending transverse to the direction of press discharge. Support bar 82 is provided with a pair of mounting blocks 84 each detachably connected with a corresponding vertically extending fork lift rod member 86 by which fork lift members 80 are adapted to be elevated and lowered relative to conveyor 14 and discharge path P of press 12.

Fork lift mechanism 78 is supported by a carriage assembly 88 for vertical displacement relative to conveyor 14 and press discharge path P and for horizontal displacement toward and away from press 12. In this respect, carriage assembly 88 includes a horizontal top plate member 90 overlying frame member 24, inner side plate members 92 extending vertically from top plate member 90 on laterally opposite sides on frame member 24, and outer side plate members 94 extending vertically from top plate member 90 and spaced laterally outwardly from the corresponding inner side plate member 92. Each fork lift rod member 86 extends vertically between the corresponding pair of side plates 92 and 94 and through a corresponding opening in top plate 90 and a support plate 95 thereon. Further, each opening through top plate 90 and support plate 95 is provided with a corresponding bearing sleeve 96. Bearing sleeves 98 are welded or otherwise attached to the lower ends of each pair of side plates 92 and 94. Accordingly, fork lift rods 86 and thus fork lift members 80 are vertically reciprocable relative to carriage assembly 88, such vertical reciprocation being guided by bearing sleeves 96 and 98. In the embodiment disclosed, the upper ends of fork lift rods 86 are interconnected by means of a cross member 100, and the fork lift rods and thus members 80 are elevated and lowered relative to the carriage assembly and thus press discharge path P by a hydraulic piston and cylinder unit 102 mounted between cross member 100 and support plate 95 of the carriage assembly. More particularly in this respect, piston and cylinder unit 102 includes a piston rod 104 and a cylinder 106 relative to which the piston rod is extendable and rectractable in a well known manner. One end of cylinder 106 is suitably fastened to cross member 100 for displacement therewith, and the outer or lower end of piston rod 104 is suitably attached to support plate member 95 of the carriage assembly. It will be appreciated, of course, that cylinder 106 is connected to a suitable source of hydraulic fluid, not shown, and that fluid flow to and from cylinder 106 is operable to elevate and lower the fork lift rods and members 80 relative to carriage assembly 88.

Figure 4:
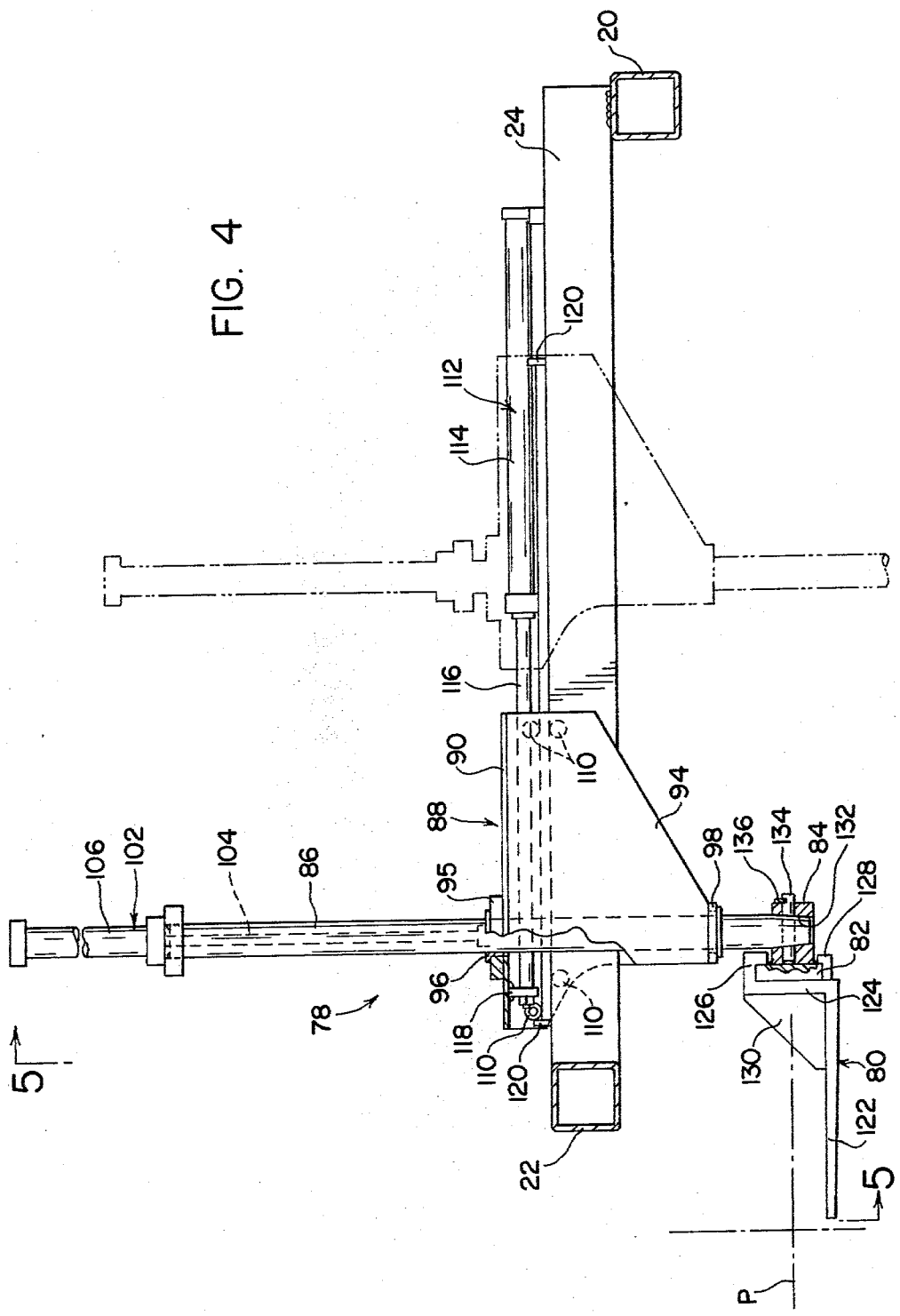
FIG. 4 is a side elevation view of the carriage and fork lift mechanism.
Figure 5:
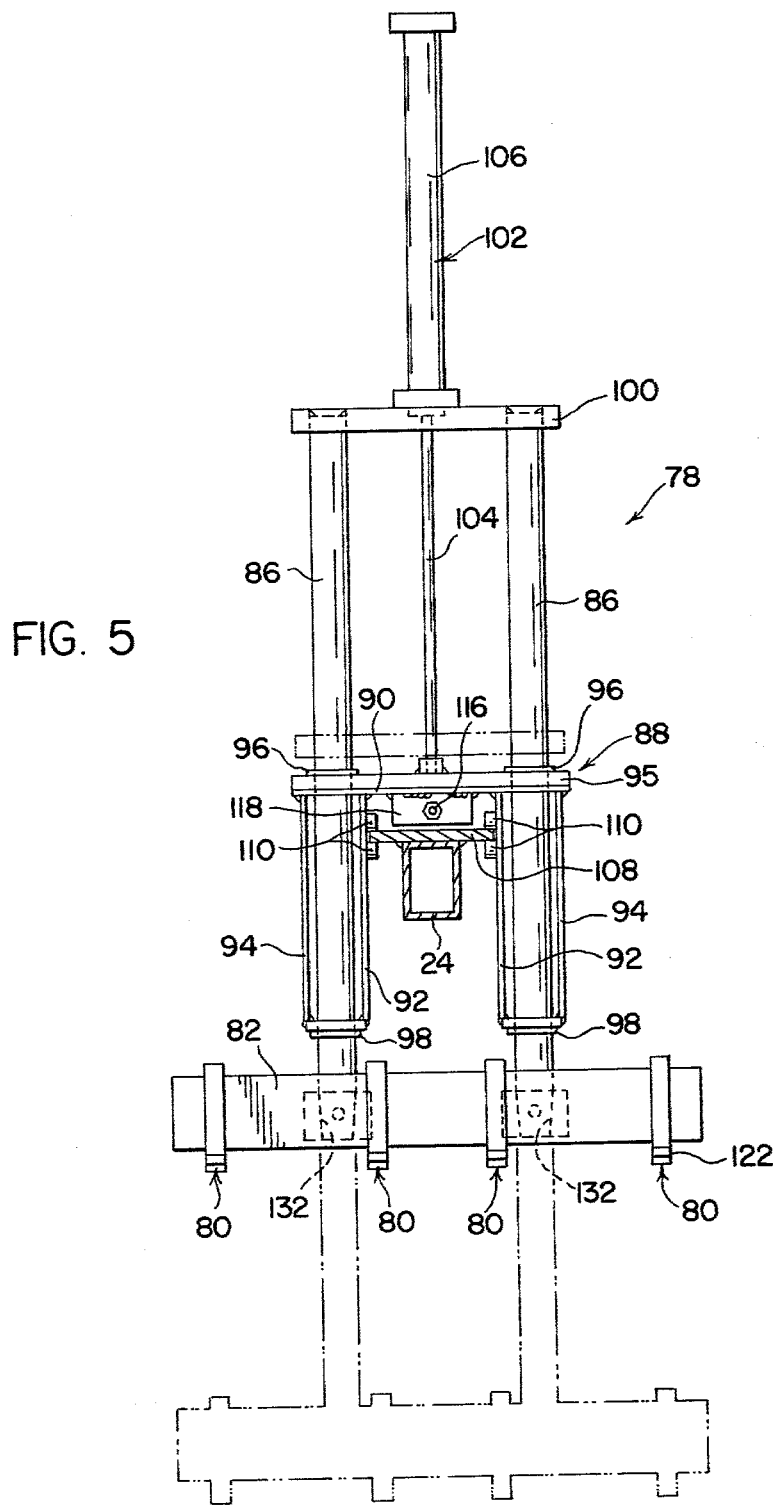
FIG. 5 is a front elevation view of the carriage and fork lift mechanism taken along line 5—5 in FIG. 4.

As best seen in FIGS. 3-5 of the drawings, a carriage guide track plate 108 is welded or otherwise secured to the top of frame member 24. Guide track plate 108 supports carriage assembly 88 and thus fork lift mechanism 78 for horizontal displacement toward and away from press 12 in a direction of press discharge path P. In this respect, guide plate 108 extends longitudinally of frame member 24 and has side portions projecting laterally thereof toward the corresponding side plate 92 of the carriage assembly. Each side portion of guide plate 108 is received between pairs of rollers 110 on the corresponding side plate member 92, whereby plate 108 and rollers 110 cooperatively support the carriage assembly for displacement along frame member 24. In the embodiment disclosed, such displacement of the carriage assembly and thus the fork lift mechanism is achieved by a fluid piston and cylinder unit 112 including a cylinder member 114 and a piston rod 116. Cylinder 114 is suitably mounted on frame member 24 against displacement relative thereto, and the outer end of piston rod 116 is attached to a plate component 118 welded or otherwise secured to the underside of top plate member 90 of the carriabe assembly. It will be appreciated that the connection between piston rod 116 and plate 118 is such that the carriage assembly is displaceable with the piston rod. It will be further appreciated that cylinder 114 is connected to a suitable source of fluid under pressure, not shown, and that fluid flow to and from cylinder 114 is operable to displace piston rod 116 in axially opposite directions relative thereto to displace carriage assembly 88 and thus fork lift assembly 78 toward and away from press 12. Preferably, guide track plate 108 is provided adjacent its longitudinally opposite ends with stop members 120 which are engaged by upper rollers 110 at the corresponding end of the carriage to limit the extent of carriage displacement in the corresponding direction.

As best seen in FIGS. 1, 4 and 5 of the drawings, each of the fork lift members 80 is laterally narrow with respect to the longitudinal direction of press discharge path P and includes a generally horizontally extending stack supporting leg portion 122 and a leg portion 124 extending upwardly from leg 122 in facial engagement with the front side of support bar 82. Each fork lift member further includes an upper L-shaped leg portion 126 which extends across support bar 82 and then downwardly therebehind and a lower L-shaped leg portion 128 which extends beneath support bar 82 and then upwardly therebehind. Preferably, a gusset plate 130 is either formed integral with or securely attached to leg portions 122 and 124 for reinforcement purposes. L-shaped leg portions 126 and 128 cooperate with leg portion 124 to define a generally C-shaped recess which enables the fork lift member to be laterally slidably received on support bar 82 with respect to the direction of discharge path P. It will be appreciated that such lateral sliding engagement of fork lift members 80 with support bar 82 enables removal thereof from the support bar for maintenance and/or replacement purposes as well as providing for lateral adjustment of the fork lift members relative to one another and to the press. In connection with removal of the fork lift members from support bar 82, it will be seen that L-shaped leg portions 126 and 128 vertically clear mounting blocks 84 attached to the rear side of support bar 82.

As will be seen in FIGS. 4 and 5 of the drawings, each mounting block 84 is provided with a vertically extending opening 132 adapted to receive the lower end of the corresponding fork lift rod 86. Further, each of the blocks 84 and the lower end of the corresponding fork lift rod are provided with aligned horizontally extending openings adapted to receive a cylindrical pin member 134 by which the fork lift rods and mounting blocks 84 are releasably interengaged. Preferably, openings 132 and the lower ends of fork lift rods 86 are radially tapered as shown to facilitate achieving alignment of the horizontal pin openings therein when the rod ends are introduced into openings 132 and, preferably, pins 134 are laterally slotted to receive retaining plates 136 which are suitably attached to the corresponding block 84 to retain pins 134 in place.

In connection with the operation of the apparatus herein illustrated and described, FIG. 1 of the drawing illustrates a stack 138 of metal sheets 140 supported on conveyor 14 by a corresponding pallet 142 and having a length corresponding generally to the width of the conveyor. FIGS. 1 and 2 further illustrate a plurality of stacks 144a–e of metal sheets supported on conveyor 14 by a single open top pallet 148. These stack illustrations in FIGS. 1 and 2 represent some of the palletizing functions adapted to be selectively achieved in connection with operation of the apparatus. Further in connection with such selective operation of the apparatus, flipper assemblies 42, side tamper assemblies 46 and 48, end stop member 62, and conveyor section 16 are employed in connection with the palletizing of long sheets of material such as sheets 140, and fork lift mechanism 78 and end stop member 62 are employed in connection with the forming of stacks of short sheets of material such as the sheets of stacks 144a-e and the positioning of stacks of short sheets on a pallet on the conveyor.

With regard first to the palletizing of short sheets of material, side members 30 and thus flipper assemblies 42 and side tamper assemblies 46 and 48 are first positioned in the laterally outermost locations thereof relative to tracks 26 and 28 such that the flipper assemblies and tamper assemblies are spaced laterally outwardly of the corresponding side edges of the sheet material to be discharged from the press. An empty open top pallet 148 is then positioned on conveyor section 16 in any suitable manner and in vertical alignment with press discharge path P and fork lift mechanism 78. When pallet 148 is so located, piston and cylinder units 102 and 112 are actuated to elevate fork lift members 80 and to position the fork lift members with respect to press 12 as shown in FIG. 2. End stop member 62 is then moved into the position shown in FIG. 2 wherein the component parts are properly located to receive sheet material from press 12.

Press 12 is then started, and it will be appreciated that the sheet material feed and the shearing stroke of the press are controlled such that sheets of a length corresponding generally to the distance between stop member 62 and shearing blades 12a and 12b are sequentially cut so as to drop onto the fork lift members 80. The width of the sheets is of course that of the sheet metal coming through the press. End stop member 62 is engaged by the sheets of material to assure proper positioning thereof in the stack in the direction of discharge. In connection with the stack height, it will be appreciated that appropriate control can be provided for actuating piston and cylinder unit 102 to gradually lower fork lift members 80 as the stack builds up thereon. When the desired stack height is reached, the press is stopped and end stop member 62 is displaced to the right in FIG. 2 a distance sufficient to avoid interference thereof with the lowering of the stack onto the pallet and the subsequent displacement of the fork lift mechanism back to the position shown in FIG. 2.

Assuming pallet 148 to be empty and that stack 144a is to be the first stack deposited thereon, it will be appreciated that the portion of the pallet on which stack 144a is shown to lie is positioned vertically beneath the fork lift members 80. When the stack is formed on members 80, piston and cylinder unit 102 is actuated to lower the fork lift mechanism to position the stack 144a onto the underlying portion of pallet 148. In doing so, fork lift member 80 enter the space between the pallet beams 148a so that the stack rests on the tops of the beams. Piston and cylinder unit 112 is then actuated to displace carriage 88 and thus fork lift members 80 to the right in FIG. 2 out of engagement with the stack. Thereafter, piston and cylinder units 102 and 112 are actuated to elevate the fork lift mechanism and horizontally displace the latter back to the position shown in FIG. 2. End stop member 62 is then moved back into the position thereof shown in FIG. 2, whereby the component parts are located to receive a second stack of sheet material on the empty forks now supported adjacent the point of discharge from the press.

The press is then actuated to again feed and cut the sheet material and, when the desired stack height is achieved, the press is stopped and end stop member 62 is then displaced to the right in FIG. 2. Presuming the second stack to be stack 144b in FIG. 1, conveyor 14 is jogged to position the corresponding area of pallet 148 beneath fork lift members 80. The latter are then lowered to deposit stack 144b on the pallet. When stack 144b is in place and the fork lift mechanism has been repositioned and has received a third stack corresponding to stack 144c in FIG. 1, conveyor 14 is again jogged to reposition stack 144a beneath fork lift members 80. Piston and cylinder unit 112 is then actuated to displace carriage 88 and thus the fork lift mechanism and the third stack 144c thereon to the right in FIG. 2. When the third stack is positioned to overlie its corresponding location on pallet 148, piston and cylinder unit 102 is actuated to lower the fork lift mechanism for the third stack to be deposited on the pallet. Piston and cylinder unit 112 is then actuated to displace carriage 88 to the right in FIG. 2 to disengage the fork lift members from the third stack. It will be appreciated that the fork lift mechanism and conveyor are then appropriately manipulated to deposit stack 144d. It will be further appreciated that two additional stacks corresponding in dimension to stacks 144a-d could be deposited on pallet 148 in place of stack 144e. The procedure in the forming of stack 144e and the deposit thereof on pallet 148 will be apparent from the foregoing description, and it will be appreciated that a number of stacks similar to stack 144e can be deposited on pallet 148. When a pallet has been filled with stacks, the conveyor can be actuated to displace the pallet laterally of the press whereafter another pallet can be positioned on the conveyor to receive stacks.

It will be appreciated that the number of stacks that can be provided in a given line between the opposite sides of the conveyor will depend on the length of the individual stacks in the latter direction and the extent to which the carriage assembly can be displaced to the right in FIG. 2 relative to the conveyor to provide sufficient clearance for disengagement of fork lift members 80 from a stack lowered onto a pallet. Accordingly, it will be appreciated that the frame structure could be extended to the right in FIG. 2 relative to the width of the conveyor to enable sufficient displacement of the carriage to the right for providing stacks across the entire width of the conveyor. Still further, it will be appreciated that a carriage drive arrangement other than piston and cylinder unit 112 could be provided which, in the embodiment shown, would enable extension of the carriage guide track and thus the extent of carriage displacement to the right in FIG. 2. For example, a suitable drive motor arrangement could be provided on the carriage for driving the upper ones of the rollers 110 to achieve carriage displacement. In any event, it will be appreciated that the fork lift mechanism of the present invention enables the positioning of one or more stacks of sheets material on a pallet on the conveyor and in alignment with one another with respect to the direction of the width of the conveyor and/or in the direction transverse thereto and enables utilizing the full width of the conveyor with respect to the positioning of a plurality of stacks in alignment with one another thereacross.

In connection with the palletizing of long sheets of material such as represented by stack 138 in FIG. 1, it will be seen from FIG. 2 that the lower position of fork lift mechanism 78 extends vertically across discharge path P and thus would interfere with the discharge of sheet material of a length of that of sheets 140. In the embodiment of the invention illustrated, such interference is eliminated by removing fork lift members 80 and support bar 82 from the lower ends of fork lift rods 86 and then elevating the fork lift rods to a location in which the lower ends thereof are spaced above discharge path P. In this respect, an empty pallet or other suitable support is positioned on conveyor section 16 beneath the fork lift members, and piston and cylinder unit 102 is actuated to lower the fork lift members onto the pallet. Retaining plates 136 are then removed from support blocks 84 which frees pins 134 for removal to release the lower ends of fork lift rods 86 for vertical displacement relative to support blocks 84. Thereafter, piston and cylinder unit 102 is actuated to elevate fork lift rods 86 relative to carriage 88 and to a position in which the lowermost ends of the rods are spaced above discharge path P. The conveyor is then actuated to displace the fork lift members 80 and support bar 82 away from the press. This removable arrangement for the fork lift member assembly, in addition to eliminating interference with the delivery of long sheets from the press, advantageously enables any maintenance or replacement work to be performed on the component parts of the assembly while the palletizing apparatus is being utilized in connection with the palletizing of long sheets of material. At the same time, it will be appreciated that the frame assembly for the apparatus could be constructed for the horizontal frame member 24 to be vertically spaced above discharge path P of the press a distance sufficient to enable elevation of the fork lift member assembly to a point above the discharge path, whereby removal of the fork lift member assembly would not be necessary. Even with a structural arrangement of the latter character, however, a removable interconnection between the fork lift member assembly and fork lift rods would be preferred to enable removal thereof when desired for maintenance and/or replacement purposes.

Upon removal of the fork lift member assembly and elevation of the fork lift rods 86 to a location above discharge path P, side members 30 of the palletizing apparatus are displaced laterally inwardly from the position shown in FIG. 3 to locations which enable the innermost rollers 44 on flipper assemblies 42 to underlie the opposite side edges of sheet material to be delivered from press 12. End stop member 62 is displaced to the right in FIG. 2 to a position corresponding to the length of the sheet material to be palletized. An empty pallet or dunnage providing a length across the conveyor corresponding to the length of sheet material to be stacked is then positioned on conveyor portion 16 beneath the discharge path, and conveyor portion 16 is elevated by jack assemblies 17 to position the pallet between side tamper assemblies 46 and 48 and beneath flipper assemblies 42. At this time, tamper plate 54 of side tamper assembly 48 is actuated to its extended position toward tamper plate 50 of side tamper assembly 46, and end stop member 62 is positioned in a vertical plane corresponding to the location of the leading ends of the sheets to be stacked. The press is then started and the sheet material is fed through press 12 in a direction toward end stop member 62 with the marginal side edges thereof riding on the laterally inner rollers 44 of flipper assemblies 42. When the predetermined length of material has been fed through the press, shearing blades 12a and 12b of the press are actuated to sever the sheet material. Concurrently with the shearing operation, flipper assemblies 42 are indexed to drop the sheet onto the pallet and side tamper plate 54 is actuated to a retracted position away from the corresponding side edge of the sheet. It will be appreciated from FIG. 3 of the drawing, that the sheet material is dropped by indexing the left hand flipper assembly clockwise and indexing the right hand flipper assembly counterclockwise, and that such indexing moves the succeeding line of rollers 44 into positions to underlie the marginal edges of the succeeding sheet of material delivered from press 12.

Following the dropping of a sheet onto the pallet, side tamper plate 54 is extended toward side tamper plate 50 and end stop member 62 is displaced to its position corresponding to the end plane of the stack, whereby the sheet is properly positioned laterally and longitudinally on the pallet. Side tamper member 54 and end stop member 62 remain in the latter positions until the flipper assemblies are indexed to drop the next sheet. The foregoing sequence of operations is repeated until a stack of a desired height is achieved, and it will be appreciated in connection therewith that screw jacks 17 will be actuated to progressively lower conveyor section 16 to maintain the top of the stack properly located relative to the flipper assemblies and side tamper assemblies. When a stack of desired height is achieved, the press is stopped and conveyor section 16 is lowered into horizontal alignment with the remainder of the conveyor to facilitate displacement of the stack from the press area.

When it is again desired to palletize short lengths of sheet material, the fork lift member assembly is placed on a pallet and moved along conveyor 14 into position underlying carriage assembly 88 and fork lift rods 86. Piston and cylinder unit 102 is then actuated to lower fork lift rods 86, and the carriage and/or conveyor can be jogged as may be necessary to align fork lift rods 86 with openings 132 in support blocks 84 of the fork lift member assembly. Piston and cylinder unit 102 is then actuated to displace the lower ends of rods 86 into openings 132, after which pins 134 and retaining plates 136 are placed in their corresponding positions to complete the assembly operation. Thereafter, the component parts of the palletising apparatus are manipulated as described hereinabove to form stacks of short sheets of material and to position the stacks on a pallet on the conveyor.

While considerable emphasis has been placed herein on the specific structural features of the embodiment illustrated, it will be appreciated that many changes may be made therein, including those suggested hereinabove, without departing from the principles of the present invention. For example, many arrangements can be devised for achieving horizontal and vertical displacement of the fork lift mechanism to enable the positioning of a plurality of stacks of sheet material in alignment with one another, and many embodiments of fork lift mechanisms can be devised for this purpose. Further, it will be appreciated that the sheet material to be cut and palletized can be other than sheet metal and that the source thereof can be other than the output of a sheet metal shearing press. Still further, it will be appreciated that the underlying support surface onto which the stacks of material are deposited could be other than a conveyor mechanism and, in connection with conveyor mechanisms, could be a conveyor structure other than the roller type conveyor disclosed. Moreover, while it is preferred to provide multiple stacks on a single open top pallet in the manner described herein, it will be appreciated that the fork lift members could support an individual closed top pallet for each stack and deposit the pallet and stack on the conveyor in the aligned relationships described herein. These and other embodiments of the present invention and modifications of the embodiment herein disclosed will be obvious and/or suggested to those skilled in the art, whereby it is to be distinctly understood that the foregoing descriptive material is to be interpreted merely as illustrative of the present invention and not as a limitation.

Having thus described the invention, it is claimed:

1. Apparatus for supporting a stack of sheets received from a source in a direction of discharge and transferring the stack to support means therefor comprising: a frame means including a vertically fixed horizontal frame portion overlying said support means in said direction and elevated with respect to said support means, fork lift means, means supporting said fork lift means on said frame portion for horizontal displacement between first and second positions in said direction and for vertical displacement between elevated and lowered positions relative to said support means, said fork lift means in said elevated and first positions being positioned to receive sheet material from said source, and means to displace said fork lift means between said first and second positions and between said elevated and lowered positions.

2. Apparatus according to claim 1, wherein said means supporting said fork lift means includes carriage means supported by said horizontal frame portion for displacement in said direction, said fork lift means including fork lift member means and means supporting said fork lift member means for vertical displacement relative to said carriage means.

3. Apparatus according to claim 2, wherein said means supporting said fork lift member means includes vertically reciprocable rod means, and means detachably interconnecting said fork lift member means with said rod means.

4. Apparatus according to claim 3, wherein said means detachably interconnecting said rod means and fork lift member means includes opening means in said fork lift member means receiving said rod means, and retaining pin means interengaging said rod means in said opening means.

5. Apparatus according to claim 4, wherein said fork lift member means includes support bar means extending transverse to the direction between said first and second positions and including said opening means, and fork lift members supported on said support bar means for sliding movement relative thereto in said transverse direction.

6. Apparatus according to claim 5, wherein said rod means is slidably supported by said carriage means and said means to displace said fork lift means vertically includes hydraulic piston and cylinder means between said carriage means and said rod means.

7. Apparatus according to claim 6, wherein said means to displace said fork lift means horizontally includes hydraulic piston and cylinder means between said frame means and carriage means.

8. Apparatus according to claim 7, wherein said horizontal frame portion includes track means, and roller means on said carriage means engaging said track means and supporting said carriage means for displacement in said direction.

9. Apparatus according to claim 2, wherein said means supporting said fork lift member means includes vertically reciprocable rod means, said fork lift member means including support bar means on said rod means and extending transverse to the direction between said first and second positions, and fork lift members removably supported on said support bar means.

10. Apparatus according to claim 9, wherein said fork lift members slidably interengage said support bar means in said transverse direction.

11. Apparatus according to claim 10, wherein said rod means is slidably supported by said carriage means and said means to displace said fork lift means vertically includes hydraulic piston and cylinder means between said carriage means and said rod means.

12. Apparatus according to claim 1, wherein said support means includes conveyor means extending transverse to the direction between said first and second positions of said fork lift means.

13. Apparatus for supporting a stack of sheets received from a source in a direction of discharge and transferring the stack to support means therefor comprising, frame means including horizontal beam means elevated with respect to said support means and having one end adjacent said source of sheet material and an opposite end spaced from said source in said direction, carriage means supported on said beam means for horizontal displacement between a first position at said one end and a second position spaced from said first position in the direction toward said opposite end, fork lift means supported by said carriage means for horizontal displacement therewith and vertical displacement relative thereto, said fork lift means including fork lift members extending horizontally toward said source of sheet material, means to displace said carriage means between said first and second positions, and means to displace said fork lift means vertically relative to said carriage means.

14. Apparatus according to claim 13, wherein said fork lift means includes a pair of rods vertically slidably supported by said carriage means on laterally opposite sides of said beam means and having upper and lower ends, and means on said lower ends of said rods supporting said fork lift members.

15. Apparatus according to claim 14, wherein said means on said lower ends of said rods is a support bar therebetween and said fork lift members laterally slidably engage said support bar.

16. Apparatus according to claim 14, wherein said means on said lower ends of said rods is a support bar therebetween and said lower ends are releasably interconnected with said support bar.

17. Apparatus according to claim 14, wherein said means to displace said fork lift means vertically includes a cross member interconnecting said upper ends of said rods and fluid actuated piston and cylinder means between said cross member and said carriage means.

18. Apparatus according to claim 14, wherein said means on said lower ends of said rods is support bar means therebetween and having openings therein receiving said lower ends of said rods, and removable pin means releasably interengaging said lower ends of said rods in said openings.

19. Apparatus according to claim 18, wherein said fork lift members laterally slidably engage said support bar means.

20. Apparatus according to claim 19, wherein said means to displace said fork lift means vertically includes a cross member interconnecting said upper ends of said rod members and fluid actuated piston and cylinder means between said cross member and said carriage means.

21. Apparatus according to claim 20, wherein said means to displace said carriage means includes fluid actuated piston and cylinder means between said carriage means and frame means.

22. Apparatus for palletizing sheet material delivered from a source in a direction of discharge and relative to support means adjacent said source and having a width in said direction to receive sheet material up to a given length, said apparatus comprising frame means overlying said support means in said direction, first palletizing means supported by said frame means and including means to receive and stack sheet material of said given length from said source on said support means, and second palletizing means supported by said frame means and including fork lift means to receive a stack of sheet material from said source of a second length, said second length enabling at least two stacks of material of said second length to be received on said support means in first and second locations side-by-side in said direction, means to displace said fork lift means relative to said frame means in said direction to positions overlying said first and second locations, and means to elevate and lower said fork lift means relative to said support means.

* * * * *